R. BURNS.
COFFEE ROASTER.
APPLICATION FILED AUG. 21, 1914.

1,128,101.

Patented Feb. 9, 1915.
3 SHEETS—SHEET 1.

Witnesses:
Inventor
Robert Burns
By Attorney

R. BURNS.
COFFEE ROASTER.
APPLICATION FILED AUG. 21, 1914.

1,128,101.

Patented Feb. 9, 1915.
3 SHEETS—SHEET 3.

Witnesses:
Johna Bergstrom
Christian H. Almstaedt

Inventor
Robert Burns
By Attorney
Hauff-Marland

UNITED STATES PATENT OFFICE.

ROBERT BURNS, OF NEW YORK, N. Y., ASSIGNOR TO JABEZ BURNS & SONS, OF NEW YORK, N. Y., A CORPORATION OF NEW YORK.

COFFEE-ROASTER.

1,128,101.  Specification of Letters Patent.  Patented Feb. 9, 1915.

Application filed August 21, 1914. Serial No. 857,815.

*To all whom it may concern:*

Be it known that I, ROBERT BURNS, a citizen of the United States, residing at New York, county of New York, and State of New York, have invented new and useful Improvements in Coffee-Roasters, of which the following is a specification.

This invention relates essentially to that class of coffee roasters in which a revolving perforated drum is designed to contain the coffee beans for roasting.

The fundamental object of the invention is, to provide the drum with a heat generator for concentrating the heat radiated by the generator into the interior of the drum, and means for deflecting or shedding the material from the generator so that none of the material will actually get into direct contact with the flame of the generator and burning thereof will thereby be avoided.

Figure 1:
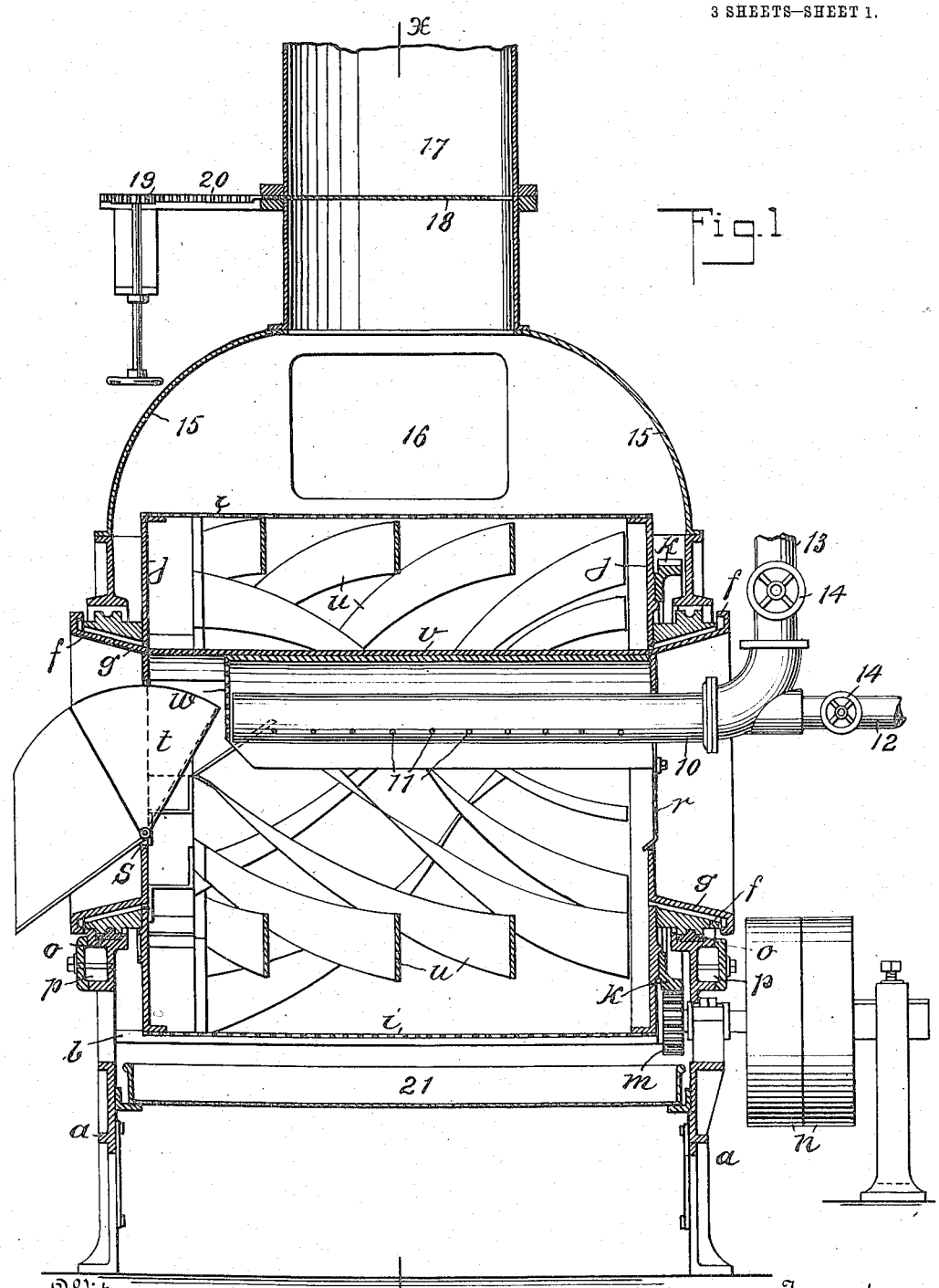
Figure 2:
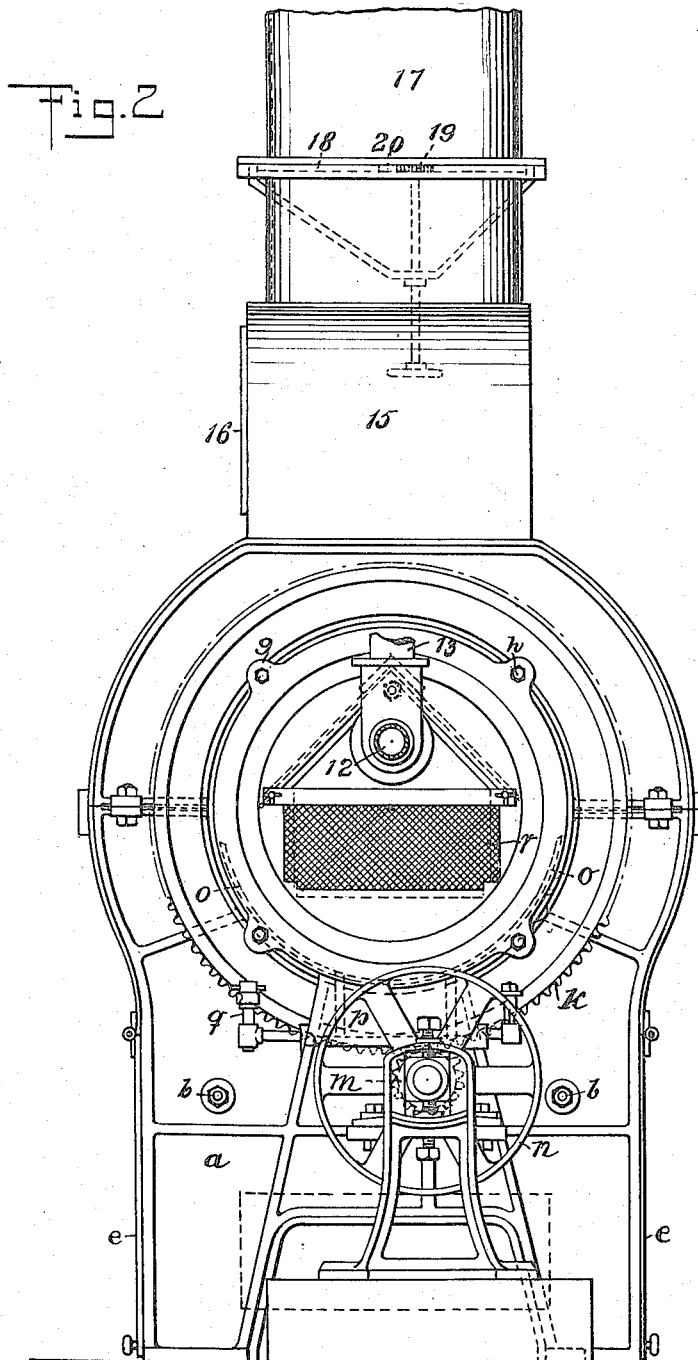
Figure 3:
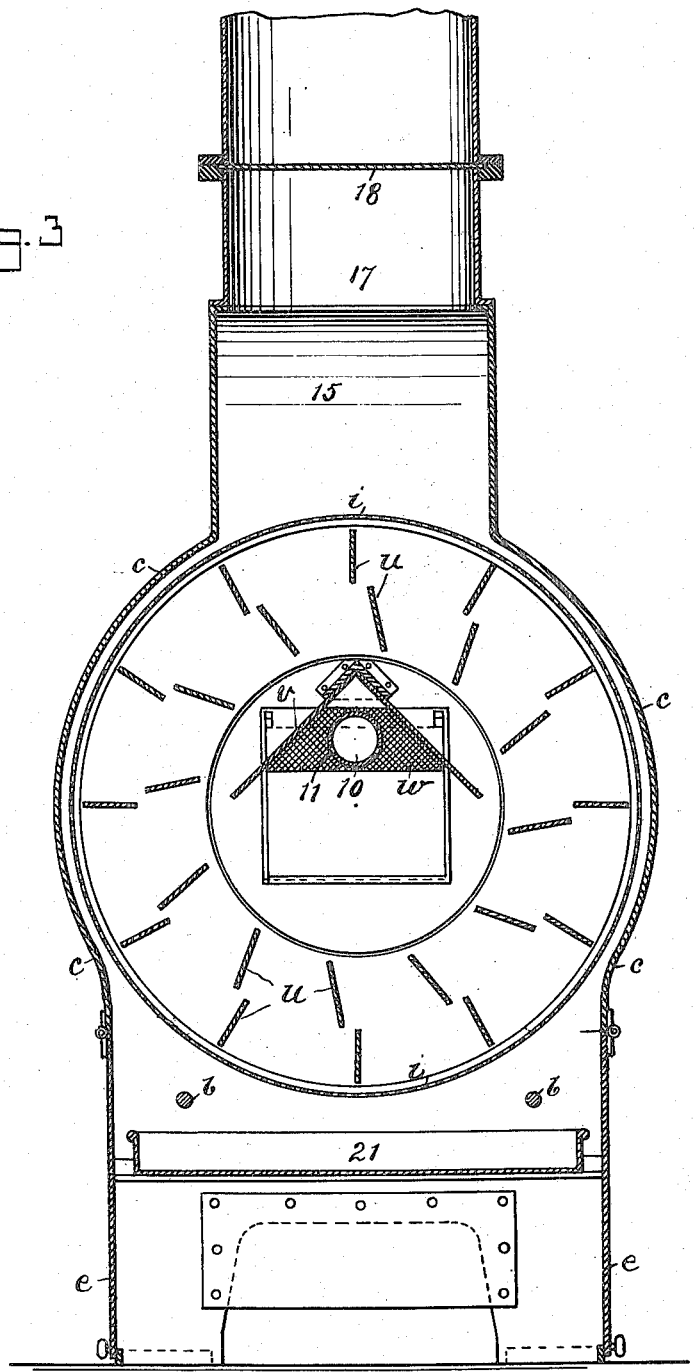

The invention is more fully described in the following specification and claims and illustrated in the accompanying drawing in which:

Figure 1 is a longitudinal vertical section of a coffee roaster embodying this invention. Fig. 2 is an end view of the same. Fig. 3 is a vertical transverse section in the plane $xx$ Fig. 1.

In this drawing the letter $a$ designates a pair of end frames provided with legs for supporting the frames. These frames are fastened together by means of bolts $b$ extending longitudinally from one frame to the other. Each side portion of the frame is covered by a sheet metal casing $c$ secured to the frame, while doors $e$ swingingly mounted on the casings will give access to the interior of the casing. Each frame $a$ is provided with an opening $f$ for the insertion of a dish shaped disk $g$. The disk is held in a stationary position by bolts $h$ in engagement with the frames.

A drum $i$ has end members $j$ mounted concentrically on the disks. The cylindrical inclosing portion of the drum is perforated for the chaff to drop through. The drum is revolved by the usual gear ring $k$ engaged by a pinion $m$ and driven by means of the ordinary fast and loose pulleys $n$. The drum carries segments of Babbitt metal $o$ to give anti-frictional bearing with the frame. Oil reservoirs $p$ arranged on the frames with inlets $q$ will supply the desired lubrication to the bearings of the drum.

One of the disks $g$ has an opening covered by a removable screen $r$ serving as a sight opening to observe the interior of the drum. The screen can be removed at any time to give access to the interior of the drum. The other disk also has an opening $s$ coacting with a swinging chute $t$. This chute can be set to act as an inlet for feeding the material into the drum, also as an outlet, and also as a door to close the opening, as shown in U. S. Patent 661,847 granted to me November 13th, 1900.

In the drum are arranged helical lifting blades $u$ for carrying the beans from the bottom to the top by the rotation of the drum.

A deflector $v$ is arranged in the drum. This deflector is secured to the disks and it is hip or roof shaped in cross section as indicated in Fig. 3, so as to shed the material. The deflector extends longitudinally along the interior above the axis of the drum and one end of it is provided with a depending perforated member $w$, the function of which will be hereinafter described.

A heat generator consisting of a gas burner tube 10 is situated below the deflector. This tube projects through one of the disks $g$ and it has a series of perforations 11 located along the tube to constitute burners. A fuel preferably gas is fed under pressure into a pipe 12, and the required proportion of air to mix with the gas is sucked into a branch pipe 13 connected to the gas inlet. Valves 14 mounted on the respective pipes control the air and gas inlets. The air inlet pipe can be connected to a blower for furnishing the proper amount of air to mix with the gas, thereby giving a blue flame at the burner openings.

The upper portion of the frames and side casings are covered by a sheet metal hood 15 having a door 16 to give access to the hood and the top of the drum. This hood has mounted on it a chimney or flue 17 provided with a damper 18 to regulate the draft. The damper is operated by means of a hand wheel having pinion 19 in engagement with a rack 20 fixed to the damper. A suction device can be connected to the chimney in order to induce a forced draft.

Below the drum between the frames is placed a pan 21 for holding the chaff which peels from the beans and falls through the perforations in the drum.

When the chute is swung downwardly to feed the material into the drum, it partly uncovers the opening *s*, thus giving access to the burner tube. The depending member *w* of the deflector shields the end of the burner tube so that none of the beans will get into lateral contact therewith, and clogging of the space between the tube and shield is obviated. At the same time the perforations in the member *w* permit a person to observe when the flame is properly regulated.

It will be readily understood that when the drum is rotated, the convoluted blade will carry the beans upward and drop them on to the shelved deflector where they will roll off and again gravitate to the bottom of the drum. The material is thus kept in constant action by the revolving drum and by reason of the intense heat generated by the burner tube all portions of the beans in the drum will be thoroughly browned.

Modifications of the invention may be made for instance: the invention could be utilized for roasting cereals by merely having smaller perforations in the drum.

I claim:

1. In a coffee roaster the combination with a revolving drum, of a heat generator including means for burning a combustible located in the drum, and means for deflecting the material from the flame of the generator.

2. In a coffee roaster the combination with a revolving perforated drum provided with lifting blades, of a heat generator including means for burning a combustible located in the drum, and means coacting with the generator for deflecting the flame of the combustible from the descending material.

3. In a coffee roaster the combination with a revolving perforated drum provided with lifting blades, of a heat generator including means for burning a combustible located in the drum, and means arranged over the generator for deflecting the flame of the combustible from the descending material.

4. In a coffee roaster the combination with a revolving perforated drum provided with lifting blades, of a heat generator including means for burning a combustible located in the drum, and angular means arranged over the generator for deflecting the flame of the combustible from the descending material.

5. In a coffee roaster the combination with a revolving perforated drum provided with lifting blades, of a heat generator including means for burning a combustible located in the drum, and a hip shaped deflector disposed over the flame from the combustible of the generator.

6. In a coffee roaster the combination with a revolving perforated drum provided with lifting blades, of a heat generator including means for burning a combustible located in the drum, a hip shaped deflector disposed over the flame from the combustible of the generator, and a chimney communicating with the drum.

7. In a coffee roaster the combination with a pair of stationary disks provided with a revolving perforated drum having lifting blades, of a burner tube projecting through one of the disks into the drum, a hip shaped deflector arranged over the burner tube, and a chimney communicating with the drum.

8. In a coffee roaster the combination with a pair of stationary disks, a rotary perforated drum having lifting blades mounted on the disks, of a gas burner tube projecting through one of the disks longitudinally into the drum, a hip shaped deflector arranged over the burner tube and secured to the disks, and a chimney communicating with the drum.

9. In a coffee roaster the combination with a pair of stationary disks, a rotary perforated drum having lifting blades, mounted on the disks, of a gas burner tube projecting through one of the disks longitudinally into the drum, a hip shaped deflector disposed over the burner tube and secured to the disks, said deflector having a depending perforated member to shield the end of the burner tube, and a chimney communicating with the drum.

In testimony whereof I have hereunto set my hand in the presence of two subscribing witnesses.

ROBERT BURNS.

Witnesses:
CHRISTIAN H. ALMSTAEDT,
HAZEL V. MCELROY.